United States Patent [19]

Bonnebat et al.

[11] 4,385,089
[45] May 24, 1983

[54] PROCESS FOR PREPARING BIAXIALLY ORIENTED HOLLOW SHAPED ARTICLES FROM THERMOPLASTIC MATERIALS

[75] Inventors: Claude Bonnebat, Pontault Combault; Gilbert Roullet, Tremblay, both of France

[73] Assignee: Rhone-Poulenc Industries, Paris, France

[21] Appl. No.: 127,105

[22] Filed: Mar. 4, 1980

Related U.S. Application Data

[63] Continuation-in-part of Ser. No. 902,400, May 3, 1978, abandoned.

[30] Foreign Application Priority Data

May 4, 1977 [FR] France .................. 77 13488

[51] Int. Cl.³ .................. B29C 17/07
[52] U.S. Cl. .................. 428/35; 264/523; 264/528; 264/529; 264/530; 264/535; 264/537; 264/540; 215/1 C
[58] Field of Search .............. 264/523, 524, 528, 525, 264/529, 530, 535, 537–543, 520, 521; 428/35, 910; 215/1 C

[56] References Cited

U.S. PATENT DOCUMENTS

| | | | |
|---|---|---|---|
| 3,733,309 | 5/1973 | Wyeth et al. .............. | 264/540 X |
| 3,888,961 | 6/1975 | Schonewald .............. | 264/528 |
| 3,970,419 | 7/1976 | Valyi .............. | 425/526 X |
| 4,039,641 | 8/1977 | Collins .............. | 264/528 X |
| 4,233,022 | 11/1980 | Brady et al. .............. | 425/526 X |

FOREIGN PATENT DOCUMENTS

1960129 7/1970 Fed. Rep. of Germany .
2554281 6/1976 Fed. Rep. of Germany .
2606355 9/1976 Fed. Rep. of Germany .

Primary Examiner—Jan H. Silbaugh
Attorney, Agent, or Firm—Burns, Doane, Swecker & Mathis

[57] ABSTRACT

A process for preparing biaxially oriented hollow shaped articles, in particular bottles of thermoplastic material, by biaxial draw- and blow-molding comprises blow-molding a preform and subsequently maintaining the thermoplastic material in close contact with the hot walls of the mold at a temperature which is in the range from about the minimum effective temperature for biaxial orientation of the thermoplastic material to about 40° C. above this temperature for a period of time which is sufficient to partially reduce internal residual stresses in the hollow shaped articles. Following this partial thermo-stabilization, the hollow shaped article preferably is subjected to cooling, whereby the pressure within the article is at least partially maintained or the shaped article is cooled or allowed to shrink and subsequently subjected to a second blow-molding procedure.

16 Claims, 5 Drawing Figures

PROCESS FOR PREPARING BIAXIALLY ORIENTED HOLLOW SHAPED ARTICLES FROM THERMOPLASTIC MATERIALS

CROSS-REFERENCE TO RELATED APPLICATION

This application is a continuation-in-part of copending application Ser. No. 902,400 filed May 3,, 1978, now abandoned the disclosure of which is hereby incorporated by reference.

BACKGROUND OF THE INVENTION

1. Field of the Invention

The present invention relates to a process for preparing biaxially oriented hollow shaped articles from thermoplastic materials. The invention also relates to hollow shaped articles with improved thermomechanical properties, which are obtained according to the process.

2. Description of the Prior Art

The production of hollow biaxially oriented shaped articles uses semi-finished products which are obtained in a previous or intermediate stage of production and which may be sheets, plates, discs, or various flat articles (in case of thermoforming), parisons or preforms (in the case of biaxially oriented drawing of flasks, bottles, and the like).

Two methods in particular are known for the manufacture of biaxially oriented bottles from plastic materials. The first method, the so called "cold parison" method, comprises manufacturing a preform, cooling it to ambient temperature, storing it, reheating the preform to a temperature wherein the material exhibits a visco-elasticity which is suitable for biaxial orientation of the material, and then forming the shaped article by drawing and blowing in a cooled mold, in order to obtain and maintain the final hollow shape of the article. The second method, the so called "in line" or "hot parison" method, comprises for example injection- and blow-molding, injection- and blow-molding with biaxial orientation, and extrusion blow-molding with biaxial orientation, by forming a parison by injection, injection-blowing or extrusion-blowing. After the parison has been cooled to a sufficient degree, in order to bring it to the desired orientation temperature, it is drawn and blown while in a mold which is suitable for molding under cooling. If desired, in addition to this treatment, a step of conditioning the preform or parison under temperature, or providing a homogenous distribution of the temperature in the preform or the parison, may be added.

The molecular orientation of the material improves the transparency and the gloss of the hollow shaped articles and provides them with an increased rigidity, an improved resistance against scratching and shocks, a reduced permeability for gases, and a reduced tendency for creepflow. The improvement of the mechanical and optical properties which is observed in numerous oriented thermoplastic polymers is particularly important and advantageous in the case of hollow shaped articles, in particular articles made from semicrystalline polymers, especially those polymers which can be obtained in amorphous form as a preform and which crystallize to large degree under orientation in the course of the biaxial drawing, thereby preserving their transparency. Ethyleneglycol polyterephthalate (PET) is a typical example in this regard.

However, the biaxial orientation of the hollow shaped article has the disadvantage of strongly increasing internal stresses, thereby causing a reduction of dimensional stability under heat. This effect is due to the fact that the oriented material has a tendency to shrink, for example during hot filling, which results in release of the stresses, causing distortion and deformation of the hollow shaped article, e.g., a container, which in the case of the oriented material can take place at a lower temperature than in the case of a nonoriented material. This phenomenon is particularly important in the case of polymers drawn from an amorphous preform which undergo strong crystallization during drawing, such as polyesters and particularly PET.

During the blow-molding of objects with an irregular shape, such as bottles, from a regularly shaped preform, the stresses are not of an equal degree in all parts of the finished object. For example, the bottom and the neck of the bottle are drawn little with respect to the median part. This results in the fact that not all of the parts have the same degree of crystallinity, as certain parts may remain in the amorphous state.

In the amorphous state the material is transparent. In the crystalline state, the material is either opaque (spherullitic crystallization) or transparent (nonspherullitic crystallization) depending on the conditions of temperature and the degree of molecule orientation. For PET, rapid spherullitic crystallization of the nonoriented, amorphous material is observed beginning at 140° C. The result is an opacification of parts, such as the zones close to the neck and the bottom, while the bioriented parts are transparent (nonspherullitic crystalline state).

It is well known that the rigidity of a hollow shaped article is dependent on the intrinsic rigidity of the material (modulus of rigidity), and also on the degree of orientation, the shape and thickness of the wall (mean thickness and regularity of the walls). In flasks in which the wall is relatively thin, ribs are incorporated to increase the rigidity of the walls, in particular against transversely applied compression stresses. Furthermore, the rigidity depends on the form and the deepness of the ribs. Thus, the reproduction of the ribs of the mold (stamped reproduction) is not very satisfactory in the case of hollow shaped biaxially oriented articles which are blow-molded on a cooled mold, even in the case of blow-molding under high pressure. Therefore, in spite of their higher modulus of elasticity, biaxially oriented shaped articles with ribbed walls generally do not exhibit better mechanical properties under instant compression than do nonoriented hollow shaped articles.

Consequently, biaxially oriented hollow shaped articles, which have been developed for use as containers for pressurized liquids, usually are in the form of containers having smooth walls. In many cases a lowering of the dimensional stability due to the presence of internal stress renders the hollow biaxially oriented shaped article unsuitable for filling with hot liquids. Also, such materials are not suitable for the manufacture of hollow shaped articles which later have to undergo a pasteurization, or reusable containers which have to be washable under heat.

In order to increase the dimensional stability of biaxially oriented hollow shaped articles, it has already been proposed to subject these articles to a thermo-fixing or heat setting treatment in such a way that all of the remaining internal stresses and compulsions are eliminated. This total thermofixation treatment is closely copied from the technique which is used in the field of film and fiber making, and is effected at high temperature, after the article has obtained its final shape. For example, French Pat. No. 2,285,978 discloses a thermofixing treatment after blow-molding, which in the case of crystallizable thermoplastic materials is effected at a temperature of the material above 140° C. For PET, prior art heat setting temperatures range from 140°–210° C., for example. This thermo-fixing treatment at an elevated temperature results in an increase in crystallinity as a function of temperature and treatment time, and includes numerous disadvantages, some of which are:

- a decrease in the rate of production which becomes marked as the difference between the thermo-fixing temperature and the temperature at which the article is taken from the mold increases;
- a risk that substantial distortions and contractions in various parts of the shaped article may occur during removal from the mold, if the thermo-fixing period is not sufficiently long;
- the disadvantages which are inherently connected with heating metallic molds to very high temperatures and maintaining them at these temperatures, such as dilatation problems, consumption of energy, and the like;
- the risk of spherulitic crystallization and connected therewith a loss of transparency in the lesser stretched portions of the article.

SUMMARY OF THE INVENTION

It is therefore an object of the present invention to provide a process for preparing biaxially oriented hollow shaped articles of thermoplastic material which avoids the above mentioned disadvantages.

It is a further object of the present invention to provide such a process which yields hollow shaped articles possessing good dimensional stability under heat, particularly to prevent deformation or a reduction in volume during hot filling and pasteurization, and good creepflow behavior.

It is another object of the present invention to provide such a process wherein stamped reproduction of reinforcing ribbed walls is improved, without lowering the production rate.

In order to accomplish the foregoing objects according to the present invention, the process for preparing biaxially oriented hollow shaped articles from thermoplastic materials in a biaxial draw- and blow-molding process comprises the steps of:

(a) introducing the thermoplastic material, in the shape of a hollow preform, a hollow parison, or a sheet, into the mold cavity of a mold adapted for blow-molding under heat;

(b) heating the thermoplastic material to about its temperature of biaxial orientation;

(c) bringing the thermoplastic material into close contact with the walls of the mold by applying an internal pressure to the interior of the article within the mold cavity;

(d) maintaining the thermoplastic material in close contact with the walls of the mold at a temperature which is suitable for molding and which is in the range from about the minimum effective temperature for biaxial orientation of the thermoplastic material to about 40° C. above the minimum effective temperature for biaxial orientation of the thermoplastic material for a period of time which is sufficient to form a partially thermo-stabilized hollow shaped article within the mold;

(e) allowing the hollow shaped article to cool; and (f) removing the hollow shaped article from the mold.

In the context of the instant specification and appended claims, "partial thermo-stabilizing" is defined as heat treatment effected at a relatively low temperature in the vicinity of the vitreous transition temperature, thereby affording partial relaxation of internal stresses, i.e., the treated material is still partially unstable at high temperatures.

The shrinkage, and the temperature at the onset of the shrinkage of the polymer, will be more or less modified according to the duration and the temperature of partial heat setting. In the case of a semicrystalline material this treatment affects only the orientation of amorphous zones. In contrast to the prior art, no increase in crystallinity is sought. For this reason, the process may be used both for the stabilization of oriented, amorphous polymers, such as PVC, for example, and for the stabilization of oriented crystalline polymers. The reduction in the duration and intensity of the heat setting treatment aids in avoiding spherullitic crystallization and the opacification of amorphous zones.

The reduction of the duration and the intensity of heat setting also reduces the magnitude of shrinkage upon removal from the mold, in comparison with heat setting at the high temperatures of the prior art. This is particularly important for bottles with ribbed walls.

Preferably, a further treatment of the partially thermo-stabilized hollow shaped article is combined with the foregoing thermal treatment. This additional treatment comprises maintaining the internal pressure within the hollow shaped article during a moderate cooling, or at least partially relieving the internal pressure during the cooling and subsequently reblowing the hollow shaped article, either in the same hot mold or in an identically shaped separate cold mold.

Further objects, features, and advantages of the present invention will become apparent from the detailed description of the invention and its preferred embodiments which follow, when considered together with the accompanying drawings.

DETAILED DESCRIPTION OF THE INVENTION AND ITS PREFERRED EMBODIMENTS

The thermal treatment of a hollow shaped article made from thermoplastic material according to the present invention constitutes a partial thermofixation of the material, i.e., partial relaxation of residual stresses, which is sufficient to considerably improve the potential dimensional stability of the resulting shaped articles. It is an advantage of the process according to the present invention that the thermofixation can be effected immediately at the end of the blow-molding procedure, and does not affect the production rate, which remains similar to that of conventional processes for producing biaxially oriented hollow shaped articles, in particular, conventional processes using a cold parison which are carried out on a vertically rotating molding apparatus. Nevertheless, this treatment improves certain advantageous effects of the biaxial orientation, for example, the creep resistency, and in several cases the shock resistency. Moreover, the behavior under compression of the hollow shaped articles containing ribs in their walls is improved due to the improved stamped reproduction.

In order to avoid any risk of local distortions and shrinkage during the removal from the mold, a preferred embodiment of the process according to the present invention comprises the steps of subjecting the hollow shaped article to a moderate cooling and/or a reblowing under elevated pressure immediately after the thermofixation.

This moderate cooling which is applied in combination with the previously effected partial thermofixation is carried out prior to removing the hollow shaped article from the mold and can be effected by cooling on the internal or the external walls of the hollow shaped article. If desired, it may be accompanied with a partial or a total depressurizing of the blowing fluid, permitting a shrinkage of the previously thermo-treated article, and a reblowing, which can be carried out in the same hot mold which was used for the biaxial drawing and the thermofixing treatment, or in a separate cooled mold.

The process according to the present invention can be applied to a wide variety of thermoplastic materials which can be grouped into 3 categories:

(1) polymers which are amorphorous or only weakly crystalline in the beginning and which do not crystallize to a marked extent during drawing, such as, for example, standard shock resistant polystyrene, acrylonitrile acid esters, vinyl chloride, homo- and copolymers;

(2) polymers which are drawn starting from a semicrystalline state, such as, for example, polyolefins like polyethylenes having a low or a high density, polypropylenes, polybutene-1, or ethylene/propylene copolymers; polyamides like polycaprolactames polyamides 6-6, 6-11, and 6-12; polyoxymethylenes or saturated polyesters like polyesters of low alkylene glycols, e.g., ethylene- or butylene glycol, and terephthalic acid;

(3) polymers which are drawn starting from an amorphorous state which crystallize to a large extent during the drawing, such as saturated polyesters like polyesters of aromatic acids, e.g., terephthalic acid, naphtalenedicarboxylic acids, or hydroxybenzoic acids, with diols such as lower alkylene glycols, e.g., ethylene glycol or propylene glycol, or 1,4-dihydroxymethylcyclohexane and their copolymers and mixtures thereof.

The process according to the present invention is particularly useful for the thermoplastic polymers of the third category. Among the latter, homo- and copolymers of ethylene-glycol-terephthalic-acid-esters are especially recommended, in particular ester polymers, wherein at least 95% of the acid component is terephthalic acid and at least 95% of the diol component is ethylene glycol, and which exhibit an intrinsic viscosity (determined in orthochlorophenol) of between about 0.60 and 1.10 dl/g.

The process according to the present invention can be applied to polyesters having a relatively low molecular weight (intrinsic viscosity ≦0.85 dl/g), whereby the poorer rigidity and creep behavior and the lesser suitability for blow-molding are compensated by the improvement of the properties caused by the partial thermofixation.

Biaxial orientation of the articles of the present invention is accomplished by stretching the thermoplastic in the axial and hoop directions as the article is being formed. The article of the present invention is molecularly oriented by being biaxially stretched in the axial direction and in the hoop direction. Preferably, such stretching is carried out at the orientation temperature and below the crystal melting point. The extent of the molecular orientation can be determined by known techniques. One method of determining molecular orientation is described in The Journal of Polymer Science, vol. XLVII, pages 289-306 (1960), in an article entitled "X-Ray Determination of the Crystallite Orientation Distribution of Polyethylene Terephthalate Films," by C. J. Heffelfinger and R. L. Burton; and "Structure And Properties of Oriented Poly(ethylene Terephthalate) Films" by Heffelfinger and Schmidt in the Journal of Applied Polymer Science, vol. 9, page 2661 (1965). Both articles are hereby incorporated by reference.

Biaxial orientation is instrumental in providing excellent stretch properties. Articles prepared according to the present invention typically do not have the same degree of orientation at every point on the article; however, the areas that are less oriented have a thicker shell than the areas that are more highly oriented, thereby providing relatively high overall strength to the article.

For the blow-molding step, the thermoplastic material must be brought to a temperature within its range of biaxial orientation, i.e., the temperature range for the polymer being used wherein a maximum level of orientation can be obtained with a good uniformity of wall thickness distribution and without any risk of breaking under stretching conditions. Uneven temperature profile along or across the preform can be achieved in order to improve the axial wall thickness distribution of the stretched bottle, or as a result of non-equilibrium heat transfer conditions due to reduced thermal conditioning time, or preform thickness variations. Orientation temperature range varies from polymer to polymer depending on such factors as crystallinity and glass transition temperature.

According to an embodiment of the present invention, the process of providing a thermo-stabilization directly subsequent to the blow-molding, may be carried out by heating the mold itself wherein the blow-molding is effected to a maximum temperature of about 30° C. to about 50° C., and preferably about 40° C., above the temperature which is used for the biaxial orientation of the polymer. For PET, the maximum material temperature would be about 120° C., for example.

Generally, the temperature of biaxial orientation is considered to be the temperature which is effective at the beginning of the drawing, in particular, the lowest possible temperature which is compatible with achieving stretchability, a good distribution of the material and an elevated level of orientation.

For polymers which are drawn starting from an amorphous state, the temperature of biaxial orientation usually is from about 10° to about 30° C. above the lower limit of the glass transition temperature range of the polymer. For polymers which are drawn starting from a semicrystalline state, this temperature is from about 5° to about 50° C. below the lower temperature limit of the melting range of the polymer.

For maintaining the mold at the respective temperature, circulation of a heat exchange fluid in a tube system, as is conventionally used for cooling, or contact with an adjustable electrical resistance, may be used, for example.

The period of contact between the material and the hot mold is dependent on the thickness of the walls of the hollow shaped article and the degree of stretching of the material. For walls having a thickness of between about 0.3 and about 0.5 mm, a suitable contact time is between about 1 and 20 seconds. Usually contact periods of from about 2 to about 5 seconds are sufficient for materials whose degree of planar stretching (reduction of thickness) is from about 5 to 15. During this thermofixing phase, it is essential that the biaxially oriented material be kept in close contact with the hot mold by means of a pressure which is sufficiently high to obtain a good heat transfer and which provides for an exact reproduction of the geometric shape of the mold on the material.

Once the partial thermofixation according to the process of the present invention has been effected, the material is allowed to cool before it is removed from the mold. In order to counteract any possible occurrence of a spontaneous shrinkage, it is preferable that, in addition to the partial thermofixation, steps according to one of the following embodiments be taken thereafter.

A first preferred embodiment of the invention comprises allowing the material to freely contract itself by partial or complete de-compression of the blowing fluid and subsequently repeating the blow-molding of the material by re-applying a pressure which is sufficiently high to repress the material against the walls of the hot mold. It has been found that under these conditions the partially thermo-stabilized hollow shaped article can be directly removed from the mold without occurrence of any significant shrinkage during natural cooling at ambient temperature. The use of this blowing/reblowing technique is particularly recommended in the preparation of hollow shaped articles having smooth walls.

A second embodiment of the present invention comprises a partial cooling which can be effected on the internal sides of the walls of the hollow shaped article before removing it from the mold, or on the external sides of the walls of the hollow shaped article after it has been removed from the mold. In both cases, conventional cooling means are used, such as projection of liquified gases, spraying a water mist, blowing with cold air, or the like. It is necessary that the average cooling, which is only in the range of from about 10° to about 30° C., is achieved in all portions of the hollow shaped article in such a manner that upon removing it from the mold or upon releasing the internal pressure, there are no possibilities for shrinkage left. In the case of an internal cooling, it is sufficient to inject or disperse by means of a conventional injection apparatus an amount of the cooling fluid which is sufficient to provide a lowering of the temperature of the material to about 10°–30° C., while the internal pressure in the hollow shaped article is completely or partially maintained.

One of the advantages of a moderate internal cooling in combination with the partial thermo-stabilization resides in the improvement of the reproduction of the shape in hollow shaped articles which are produced in ribbed molds.

In the case of external cooling, a remaining pressure may be retained in the interior of the hollow shaped article in such a way that after the molding, the hollow shaped article can be cooled without casing any deformation by means of a cold gas or liquid. Alternatively, after a complete or partial removal of the blowing fluid, the hollow shaped article may be transferred into a second mold with cold walls having the same shape and dimensions and be subjected to a second blow-molding step. The latter embodiment can be carried out on a machine which comprises several mold-carrying barrels or rotating units, one of which includes the molds for blow-molding/thermofixation, and another one of which includes the molds for cooling.

Of course, together with the partial thermofixation, modifications of the various above-described embodiments may also be applied within the scope of the present invention. Also, the process according to the present invention may be applied only to some portions of the hollow shaped article. For example, in the case of a bottle, the process may be applied only to the side walls of the flanks and not to the neck and the collar. Similarly, the conditions for the partial thermo-stabilization, and the conditions for the cooling combined therewith, may be varied locally depending on the form, the thickness, and the degree of stretching of each of the particular zones of the hollow-shaped article. Thus, the zone of mold which corresponds to the neck of the bottle may be maintained at a temperature which is different from that of the zone corresponding to the flanks of the bottle. Furthermore, the cooling which, for example, may be effected by the internal application of liquified carbon dioxide, may be more intensive at this thicker portion of the hollow shaped article. For this purpose, the mold may comprise several elements, each of which corresponds to a particular zone of the hollow shaped article and can be heated to a different temperature. In the same manner, the apparatus for spraying the cooling fluids can be divided into different zones which differ from each other by the number and form of the spraying orifices.

The process according to the present invention can also be used for the preparation of hollow shaped articles which are composed of several layers, for example, one of which consists essentially of a thermoplastic material and another which comprises a barrier material.

The hollow shaped articles which are obtained according to the present invention exhibit outstanding thermomechanical properties, in particular, an improved dimensional stability within a temperature range which permits the filling and cleaning of the hollow shaped articles with hot liquids. For biaxially oriented amorphous or weakly crystalline polymers, this stability is improved within a temperature range up to the glass transition temperature of the respective polymer, e.g., up to about 80° C. for polyvinyl chloride, up to about 100° C. for crystalline polystyrene, and up to about 150° C. for polycarbonates, and this temperature should not be exceeded. For semi-crystalline polymers, which have been drawn starting from an amorphous state, it has been found that the stability can reach far beyond the glass transition temperature of the preform, that is to a temperature range from about the glass transition temperature to about 40°–50° C. above the glass transition temperature (e.g., 120° C. for polyethylene terephthalate), whereas for semi-crystalline polymers, which have been oriented starting from a crystalline state, such as polyethylene or polypropylene, the stability reaches up to about 15°–30° C. below the melting point of the polymer.

Furthermore, the hollow shaped articles exhibit an improved rigidity. For example, the rigidity against compression is improved in containers, the walls of which are provided with ribs or decorations in raised design, or engraved form, and for which an excellent reproduction of the shape of the mold is achieved. The rigidity against creep-flow is improved in hollow shaped articles with smooth walls, which are used as containers for pressurized liquids (aerosols), or carbonated beverages. The different behavior by which the hollow shaped articles of the present invention are distinguished over prior art hollow shaped articles can be evaluated by determining the shrinkage stress, the degree of shrinkage, the modulus of elasticity, and the deformation rate as a function of temperature.

FIGS. 1 to 5 of the drawings show different curves which have been obtained from samples cut in a circumferential direction from the median portion of biaxially oriented bottles. Some of these samples have been prepared according to the process of the present invention by applying a partial thermo-stabilization in the hot mold and other samples are comparative bottles which have been prepared in a conventional method in a cold mold.

Figure 1:
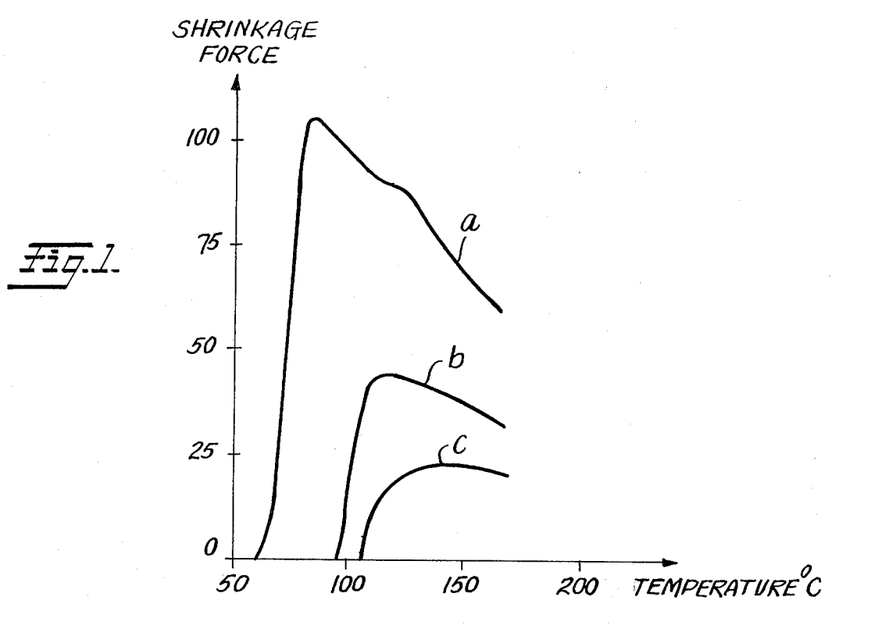
FIG. 1 represents a curve showing the shrinkage stress as a function of temperature of a portion of an article prepared according to the process of the present invention.
Figure 2:
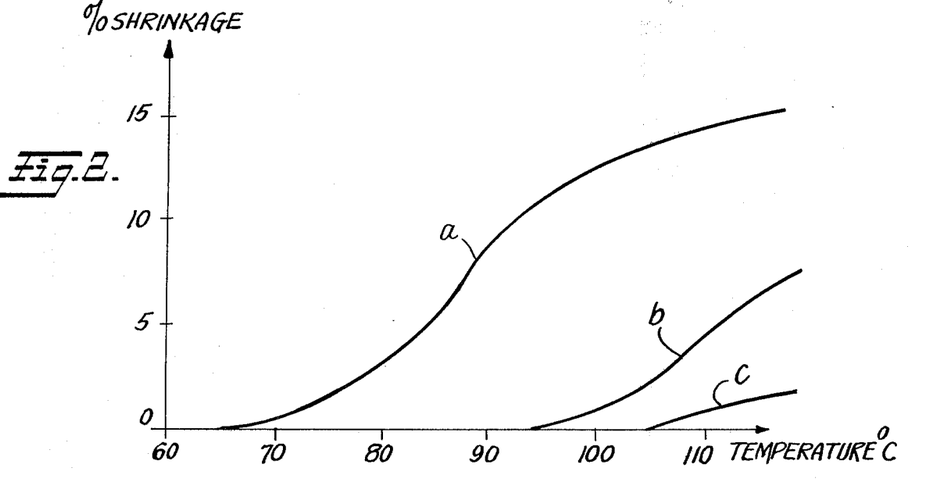
FIG. 2 represents a curve showing the shrinkage level as a function of temperature of a portion of an article prepared according to the process of the present invention.
Figure 3:
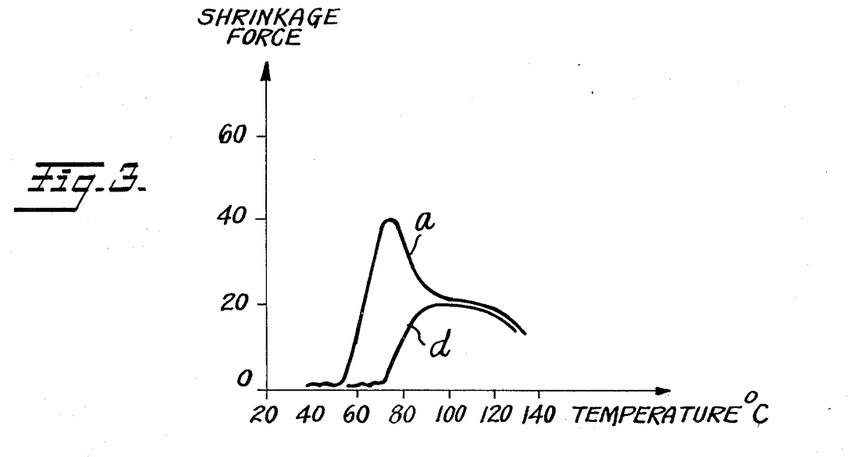
FIG. 3 represents a curve showing the shrinkage stress as a function of temperature of a portion of an article prepared according to the process of the present invention.

The shrinking stress and shrinking rate, which are shown in FIGS. 1 to 3 as a function of the temperature, have been determined in the following manner:

- a sample of 10 mm size is fixed between the jaws of a dynamometer at a distance of 30 mm therefrom and the dynamometer is placed into an oven for conditioning with hot air, the temperature of which rises at a rate of 5° C. per minute;
- to determine the shrinkage stress, the diagram stress temperature is registered by compensating the thermal dilatation of the material at the beginning of the test;
- to determine the kinetic of shrinkage, the gap between the two jaws is adjusted by means of a screw in such a way that the shrinkage stress is maintained at a level which is below or equal to 5 daN/cm$^2$, and the corresponding shrinkage is lessened by means of a comparator.

In each of the figures, 'a' represents the comparative curve. The curves 'b' and 'c' correspond to samples taken from biaxially oriented polyethylene terephthalate bottles, which have been prepared and thermo-stabilized according to the process of the present invention (see Example 1), whereby 'b' corresponds to a sample treated in a hot mold at a temperature of 130° C., and 'c' corresponds to a sample which has been treated in the hot mold, combined with cooling.

The curve 'd' corresponds to a sample taken from a biaxially oriented polyvinyl chloride bottle, which has been thermo-stabilized in the hot mold at a temperature of 130° C. (see Example 4).

As can be seen from FIGS. 1 and 2, for materials which have been drawn starting from an amorphous state (category 3), a shift of the curve shrinkage stress-/temperature or percent shrinkage/temperature towards higher temperature levels and beyond the glass transition temperature occurs in a way such that the temperature at which the beginning of the shrinkage or the shrinkage stresses appears can be considered as characteristic for the degree of partial thermofixation in the products.

For amorphous materials (category 1), FIG. 3 shows the absence of internal tensions which might appear at low temperatures, and an overall shape of the shrinkage stress spectrum curve which is void of the peak that is characteristic for frozen-in stress which is usually observed.

Figure 4:
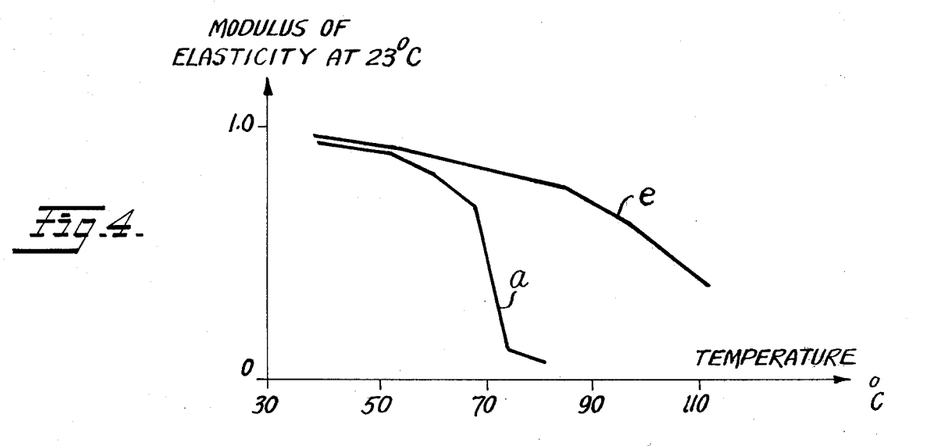
FIG. 4 represents a curve showing the modulus of elasticity as a function of temperature of a portion of an article prepared according to the present invention.

FIG. 4 shows the changing of the modulus of elasticity in relationship to the temperature. The variation of the ratio $E_{(T)}/E_{23°C.}$ is determined at a frequency of 110 hertz with the aid of a visco-elastimeter (tradename Rhevibron). The curve shows an improved maintenance of the modulus of elasticity in a biaxially oriented polyethylene terephthalate bottle, which has been partially thermo-stabilized in the mold at a temperature of 110° C., combined with cooling (see Example 2).

Figure 5:
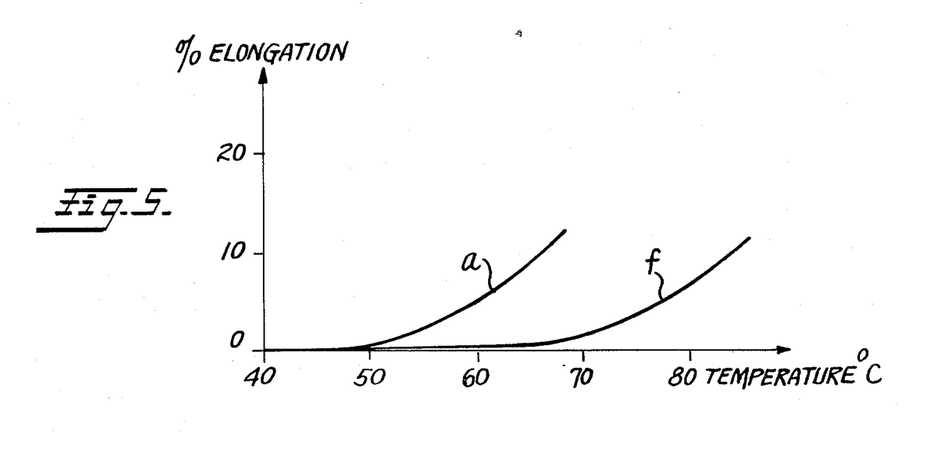
FIG. 5 represents a curve showing the creep behavior (% elongation) as a function of temperature of a portion of an article prepared according to the process of the present invention.

FIG. 5 demonstrates the difference in creep behavior. The percent elongation is determined as a function of the temperature, subjecting the material to a stress load of 635 daN/cm$^2$ at a temperature of 40° C. for a period of 1 hour and then to a progressive temperature rise at the rate of 5° C. per minute. From the curve 'f' it will be observed that a weak deformation of the bottle is obtained according to the present invention, up to a temperature in the range of 90° C., as compared with a temperature of only 50° C. for the comparative bottle.

The various following examples are given to further illustrate the present invention without limiting it.

EXAMPLE 1

1a. A bottle, having ribbed walls of saturated polyester material, a volume of 1.5 l, a weight of 42 g, a diameter of 90 mm, and a total height of 320 mm, is prepared according to the so-called "cold parison method".

The polyester material is a copolymer of polyethyleneglycol terephthalate containing 2.5% of isophthalic acid units and exhibiting an intrinsic viscosity of 0.98 dl/g which is prepared by post-condensation in the solid state under vacuum starting from a copolymer quality having a viscosity of 0.65 dl/g.

Amorphous preforms are used, which have been extruded in the form of tubes, having an external diameter of 24.8 mm and a wall-thickness of 2 mm and which have been previously cut, closed at one end, and molded into a shape for forming the neck by deformation in a set of appropriate dies after preheating. The preforms are conditioned at a temperature of between 95° and 100° C. in an oven with circulating hot air. They are then transferred to the draw-blow-molding unit, where they are blown at a temperature of 95° C. under a pressure of 20 bars. During the draw-blowing phase, the material is subjected to stretching, whereby the overall stretching ratio in the longitudinal direction is 2.6/1 (comprising the direct extension by pushing and the forming development along the ribs) and the ratio of circumferential stretching is 3.6/1.

The mold for blow-molding is provided with heating plates, which are fixed at the external side of the two halves of the mold, and with a cooling circuit permitting the introduction of liquid carbon dioxide parallel to the blowing fluid during a period of time, which can be adjusted by means of a timeswitch, whereby the dispersion of the carbon dioxide is effected through perforations along the drawing piston.

Except for the neck and the zones close to the neck, the walls of the mold are heated to a temperature of about 130° C.

The biaxially stretched material is kept in contact with the hot walls of the mold for a period of 8 seconds, then the blowing air is partially evacuated for lowering the internal pressure from 20 to 8 bars. Carbon dioxide is sprayed for a period of 3 seconds, which lowers the mean temperature of the material to below 80° C. The gas is then removed and the bottle is removed from the mold.

1b. In a second test, the foregoing procedure was repeated except that the hollow shaped article was removed from the mold without previously cooling the interior of the shaped article.

1c. In a comparative test, the blow-molding is effected according to the conventional method, that is, the mold for blow-molding is not pre-heated, but is cooled as usual by ambient air, which permits removal of the bottles from the mold after a blowing period of about 3 seconds.

The properties of the bottles are compared in the following Table 1.

TABLE 1

|  | 1a according to the invention | 1b according to the invention (but without cooling) | 1c according to conventional methods |
|---|---|---|---|
| Aspect | Crystalline | Crystalline | Crystalline |
| Shrinkage upon removal from mold (% by volume) | 0.9 | 9.4 | 0.3 |
| Resistancy against vertical stress (daN) | 18–22 | 17–21 | 12–16 |
| Resistancy against lateral stress (daN) (behavior under prehension) | 7–9 | 5–7 | 4–6 |
| Shrinkage after filling at 85° C. (% by vol. relative to the initial volume) | 1.1 | 0.8 | 21 |

As can be seen from the foregoing table, the bottles 1a and 1b can be filled at a temperature of 85° C. without any noticable deformation. Furthermore, the bottle 1a exhibits an improved resistancy against compression, in particular in the transverse direction (behavior under prehension).

EXAMPLE 2

According to the so-called "cold parison method", biaxially oriented bottles with smooth walls, exhibiting a volume of 1.5 l per weight of 55 g, which are intended for highly carbonated soda beverages (4 volumes in $CO_2$) are obtained from preforms of polyethylene terephthalate, having an intrinsic viscosity (measured at 25° C. in o-chlorophenol) of 0.84 dl/g, are prepared by injection and exhibit a threaded neck. In the stretch-blowing phase, the preform is subjected to a stretching, wherein the overall ratio of stretching in the axial direction is 2.2 and the stretching ratio in the circumferential direction is 4.1. The preheating of the preform is effected in an oven with radiating panels (maximum emission in the infrared range at a wave length of 2 microns) in such a way that the material reaches a temperature of 100° C., and after a stabilization phase, the intervening blowing is carried out at a temperature 95° C. (determined by means of an infrared pyrometer), wherein the threaded neck part is protected from the irradiation.

An apparatus for circulating hot oils through the channels situated in the interior of the mold is used for bringing its temperature to 110° C. After the usual steps of draw-blowing, the biaxially oriented material is kept in contact with the hot walls of the mold under a pressure of 15 bars for a period of 10 seconds. Thereafter a mist of water droplets is sprayed as a cooling fluid into the interior of the bottle, the interior is depressurized and the bottle is removed from the mold, whereby no shrinkage of the thus partially thermo-stabilized bottle is noticeable.

The mechanical properties of the resulting bottles are compared with those of comparative bottles which have not been thermo-stabilized by determining the modulus of elasticity upon tension (bar) at 23° C. on samples which have been cut from the walls of the bottles. The modulus of elasticity is given in Table II.

TABLE II

| Modulus of Elasticity | Bottle according to invention | Comparative Bottle |
|---|---|---|
| LONGITUDINAL DIRECTION | 37,600 | 29,700 |
| TRANSVERSAL DIRECTION | 58,600 | 69,000 |

A better equilibrium of the instant rigidity properties of the thermo-stabilized bottle is observed. The improvement of the dimensional stability is shown in FIGS. 4 and 5 of the drawing.

EXAMPLE 3

An amorphous sheet of polyethylene terephthalate of an intrinsic viscosity of 0.95 dl/g, having a thickness of 2 ml, is thermo-formed at a rate of 10 blows per minute in order to obtain transparent pots, the deepness of which is 1.8 times their diameter.

The preheating of the sheet is provided by means of infrared elements, and its deformation is carried out at a temperature of 95°–100° C. under the combined action of a piston and pressurized air.

The forming mold comprises two sets of identical shapes, the first of which is brought to a temperature of 130° C. by means of an electrically adjusted heating block, and the second of which is cooled by means of internal water circulation.

By means of a stepwise forward movement of the sheet, a first shaping is usually carried out in contact with the hot mold, wherein the material is kept for a period of 4 seconds, whereafter the pressure is released and the piston is disengaged. This permits the sheet to partially shrink during its transfer to the level of the second mold, where a second blowing and the final cooling take place, which permits the removal of the hollow article from the mold providing an exact reproduction of its shape.

The resulting pots exhibit a shrinkage of less than 3% by volume after being filled at 90° C., whereas a deformation of above 25% is observed in conventionally produced pots.

EXAMPLE 4

Starting from preforms which were obtained by extrusion blow-molding, biaxially oriented bottles of rigid polyvinyl chloride, having a weight of 60 g, are prepared on molds having ribbed walls and a volume of 1.25 l.

The stretching ratio is limited to a value of 1.60 in the longitudinal direction and to a value of 2.70 in the circumferential direction in such a way that a good distribution of the material is achieved without the risk of rupture. The temperature of biaxial orientation is at its lowest possible level, that is about 90°–92° C.

With the aid of a means for heating the mold and a means for cooling the interior of the bottle which are identical to those described in Example 1, biaxially oriented bottles are prepared which are partially thermo-stabilized by contact with the internal walls of a mold which has been brought to a temperature of 130° C. for a period of 5 seconds.

In a sample which is taken from the bottle in the transverse direction, the impact resistance on tensile test is compared with that of a comparative sample taken from a bottle which has been oriented at low temperature. The results are shown in Table III.

TABLE III

|  | Bottle according to invention | Comparative Bottle |
|---|---|---|
| Impact resistance | 900–1200 | 300–600 |
| Type of rupture | ductile | fragile |

EXAMPLE 5

The crystallinity of bottles prepared according to Examples 1 and 2 (mold temperatures of 130° C. and 110° C., respectively) is compared with that of bottles prepared according to prior art methods using higher mold temperatures to obtain relaxation of all residual stresses. Samples are taken from both the inner and outer walls of the containers. Crystallinity is measured by measuring the average refraction index, $\bar{n}$, taking three refraction index measurements in three different directions, respectively, and averaging the results:

$$\bar{n} = \frac{n_1 + n_2 + n_3}{3}.$$

The proportion of crystallinity, X%, is calculated using the following formula:

$$X\% = 100 \times \frac{2.125\bar{n} - 3.335}{0.12}$$

The density of the wall d, can be calculated from the relationship:

n=0.47d+0.95.

The initial density value of amorphous PET is d=1.335.

The results of the crystallinity measurements are given in Table IV.

TABLE IV

|  | Mold Temperature | | | | |
|---|---|---|---|---|---|
|  | Cold | 110° C. | 130° C. | 140° C. | 160° C. |
|  | | | Contact Duration | | |
|  | | 10″ | 4″ | 24″ | 24″ | 24″ |
| $\bar{n}$ internal | 1.5916 | 1.5910 | 1.5947 | 1.5948 | 1.5960 | 1.5977 |
| external | 1.5901 | 1.5922 | 1.5950 | 1.5956 | 1.5969 | 1.5987 |
| X % internal | 38 | 38 | 45 | 45 | 47 | 50 |
| external | 36 | 40 | 45 | 46 | 48 | 52 |
| average d | 1.362 | 1.362 | 1.372 | 1.372 | 1.375 | 1.38 |

It can be seen that at a mold temperature of 110° C., there is no substantial increase in crystallinity. At 130° C., there is some increase in crystallinity, but not to the extent found in the prior art higher temperatures.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for preparing transparent biaxially oriented hollow shaped articles from polyethylene glycol terephthalate by biaxial draw- and blow-molding which comprises the steps of:
    (a) introducing a thermoplastic material comprising polyethylene glycol terephthalate which is in the shape of a hollow preform into the mold cavity of a mold adapted for blow-molding in the heat;
    (b) bringing the thermoplastic material to about its temperature of biaxial orientation;
    (c) bringing the thermoplastic materials into close contact with the walls of the mold by applying an internal pressure to the interior of the hollow preform within the mold cavity by means of a pressure transfer fluid, at least a portion of the material being stretched sufficiently to avoid spherullitic crystallization upon heat treatment;
    (d) maintaining the thermoplastic material in close contact with the walls of the mold, including those portions of the material which have been stretched sufficiently to avoid spherullitic crystallization upon heat treatment, at a temperature which is suitable for molding and which is in the range from about the minimum effective temperature for biaxial orientation of the thermoplastic material to about 40° C. above the minimum effective temperature for biaxial orientation of the thermoplastic material for a period between about 1 and about 25 seconds to form a partially thermo-stabilized hollow shaped article within the mold, the mold being maintained at a temperature below 130° C., whereby an average temperature of the material of between about 80°–120° C. is reached during the period during which the internal pressure is maintained;
    (e) allowing the hollow shaped article to cool; and
    (f) removing the hollow shaped article from the mold.

2. The process as defined in claim 1 which comprises the step of cooling the partially thermo-stabilized hollow shaped article within the mold.

3. The process as defined in claim 2, wherein the internal pressure in the mold is maintained during the cooling.

4. The process as defined in claim 3, wherein the hollow shaped article is cooled by applying a cold fluid onto the internal walls of the hollow shaped article, while the internal pressure is at least partially maintained.

5. The process as defined in claim 1, wherein the internal pressure in the interior of the shaped article is at least partially released during the cooling and which further comprises the step of re-applying an internal pressure to the interior of the hollow shaped article in order to bring it into close contact with the walls of a mold.

6. The process as defined in claim 5, wherein the step of re-applying the internal pressure takes place in a separate mold, the walls of which are cold.

7. The process as defined in claim 1, wherein the period of contact is between about 1 and about 5 seconds.

8. The process as defined in claim 1, wherein the hollow shaped article is cooled after removing it from the mold by applying a cold fluid onto its exterior walls, while at least partially maintaining the internal pressure.

9. The process as defined in claim 1, which comprises the step of, prior to releasing the internal pressure, cooling the hollow shaped article to such a degree that the mean temperature of the material is lowered by about 10°-30° C.

10. The process as defined in claim 1, which comprises the steps of permitting the material to freely shrink after at least partially evacuating the pressure transfer fluid, reapplying an internal pressure which is sufficient to bring the thermoplastic material in contact with the walls of the mold in the heat, releasing the pressure, and removing the hollow shaped article from the mold.

11. The process as defined in claim 1, wherein the profile of the temperature of the mold and the distribution of the cooling are adjusted corresponding to at least one of the thickness of the walls of the hollow shaped article and the degree of stretching.

12. The process as defined in claim 1, wherein the thermoplastic material essentially consists of a homopolymer of ethyleneglycol terephthalate.

13. The process as defined in claim 1, wherein the thermoplastic material is an ethyleneglycol terephthalate copolymer.

14. The process as defined in claim 1, which comprises the step of cooling the hollow shaped article after the partially thermo-stabilizing step before finally releasing the internal pressure such that the temperature of the material is lowered by about 10° to about 30° C.

15. A hollow shaped article which is obtained according to the process defined in claim 1.

16. The hollow shaped article as defined in claim 15, wherein the drawn portions exhibit a stability at temperatures above 75° C., and which is capable of being filled with hot liquids.

* * * * *